July 16, 1963   D. B. DORSEY   3,097,756
SAFETY CLOSURE
Filed Jan. 18, 1960   7 Sheets-Sheet 3

INVENTOR.
Dennis B. Dorsey
BY
Silverman, Mullin & Cass
ATTORNEYS

July 16, 1963 D. B. DORSEY 3,097,756
SAFETY CLOSURE
Filed Jan. 18, 1960 7 Sheets-Sheet 6

INVENTOR.
Dennis B. Dorsey
BY
Silverman, Mullin & Coss
Attorneys

United States Patent Office 3,097,756
Patented July 16, 1963

3,097,756
SAFETY CLOSURE
Dennis B. Dorsey, 15 Westwood Place, Danville, Ill.
Filed Jan. 18, 1960, Ser. No. 3,050
34 Claims. (Cl. 215—9)

This invention relates generally to safety closure devices and more particularly, relates to improvements in a safety closure device adapted to be installed on a reduced dimension dispensing neck of a container to prevent unauthorized access to the contents thereof.

This is a continuation-in-part application of my co-pending application Serial No. 698,659 filed November 25, 1957, for the invention entitled "Safety Closure," now U.S. Patent No. 2,921,705.

In my co-pending patent application, there is disclosed a novel safety closure adapted to be installed on a threaded dispensing neck of a container so as to prevent children, especially, from tampering with the contents thereof. The need for such safety devices is ever increasing because of the greater number of potentially toxic compositions being brought into the home. Notwithstanding that available statistics show the increased incidence of accidental poisoning of children in the home, before the advent of the invention of said co-pending application public opposition to any significant price increase in commonly used products which are capable of causing accidental poisoning as a result of the additional cost of providing safety closures was a substantial deterrent against the use by packaging manufacturers of products with the addition of such a protective closure. Among the accomplishments of the invention of said co-pending application was the provision of a very advantageous and effective safety closure structure capable of being manufactured and installed very economically so as to encourage packaging of toxic products with such safety closures.

It is a principal object of the herein invention to provide an improved safety closure of the character described which achieves all of salient advantages of the safety closure of said co-pending invention and in addition, provides for other important improvements and economies.

The safety closure of said co-pending application is comprised generally of a cap member and a shell member having the cap member telescopically received therein. The cap member is provided with internal screw threads enabling same to be screwed onto the threaded neck of a container. The assembled cap and shell members normally were freely rotatable one relative to the other in the direction of rotation required to unscrew the cap member from the container neck, but said members had cooperable unidirectional locking means for coupling the members to enable same to be moved in unison in the proper direction for tightening the cap member on the container. Further, said members were provided with cooperating coupling means which enabled the members to be moved in unison in the direction for unscrewing the cap member, but only if one used a complementary locking tool to be associated with the members as a coupling therefor. In order to permit use of the locking tool it was necessary to selectively rotate the outer shell member independently of the inner cap member to a predetermined condition of registry of the cap and shell members. The structure enabling such manipulation of the cap and shell members one relative to the other and in unison described above lacked certain requirements which would enable manufacture of the safety closure by economical mass-production techniques and installation thereof on containers using automatic capping machinery so that a more efficient, yet economical safety closure could be provided by the invention.

The herein invention further simplifies the operation of the closure and yet, achieves some additional effectiveness without sacrificing any of the important advantages of the safety closure of the co-pending application. Accordingly, it is an important object of the invention to provide an improved safety closure of the character described which is capable of achieving such additional advantages.

Another important object of the invention is to provide a safety closure of the character described which is comprised of an inner cap member and an outer shell member normally matingly engaged, said members being rotatable in unison in the direction required to tighten the inner cap member on the dispensing neck of a container and having means capable of rendering the shell member freely rotatable relative to the inner cap in opposite directions after the inner cap is tightened on the container and cooperable coupling means for selectively moving the cap and shell members in unison in the direction for unscrewing the inner cap, said coupling means constructed to require the cap and shell members to be moved to a predetermined position of registry one relative to the other in order to permit insertion of a tool to render said coupling means effective.

Another important object of the invention is to provide a safety closure of the character described which is characterized by a highly simple mode of operation yet which is sufficiently challenging so as to deter unauthorized access to the contents thereof, especially by children.

The foregoing and other objects of the invention will become apparent as the description thereof is evolved. Preferred embodiments and modified forms of the invention have been described in detail in the specification and illustrated in accompanying drawing. Minor variations in the size, arrangement, construction and proportion of the several parts may occur to skilled artisan without departing from the scope or sacrificing any of the advantages thereof.

In the drawings, wherein the same characters of reference have been employed to designate the same or equivalent parts throughout the several figures thereof.

Referring now to the drawings, a representative container of the type with which the invention may be employed is shown partially and identified generally by the reference character 20. Same may be made of glass, plastic or other suitable material and has a dispensing neck 22 provided with external screw threads 24 to accommodate the ordinary screw-type cap for sealing the mouth of the container. The safety closure embodying the invention may be installed directly on the dispensing neck or may be made of suitable dimensions to fit on the cap itself, provided, said cap also is externally threaded. It is contemplated that other types of cooperating locking means between neck 22 and a cap may be employed so long as rotary movement therebetween is required to lock and unlock the same.

The embodiment of the invention shown in FIGS. 1 through 5 is designated generally by the reference character 30. The safety closure 30 includes an inner cap member 32 and an outer shell member 34 both of which may be formed of plastic, metal or other suitable material. Preferably, the cap member 32 is made of metal as an inverted cup-shaped member having a circular transverse wall 35 and an annular depending cylindrical wall or skirt 36 provided with internal annular grooves 38 rolled in the same. The opposite end 40 of the cap member is open to permit the cap member to be selectively screwed on and off the threaded neck 22. Upstanding from a medial portion of the transverse wall 35 is a bearing or island formation 41. Adjacent the marginal edge of the wall 35 is a plurality of spaced apart, upstanding bosses or ridges 42 of generally triangular cross-section. The bosses or ridges 42 are uniformly spaced apart along a curved line generally coaxial with the perimetric edge of the wall 35 and may be integrally formed with the cap member. The end bosses 42A and 42B are arcuately spaced apart a greater distance than the spacing between adjacent bosses 42 of the line, the space or gap between bosses 42A and 42B being designated 43. This gap 43 may be considered in the nature of a depression or indentation in wall 35 in view of the elevation of ridges 42.

Figure 1:
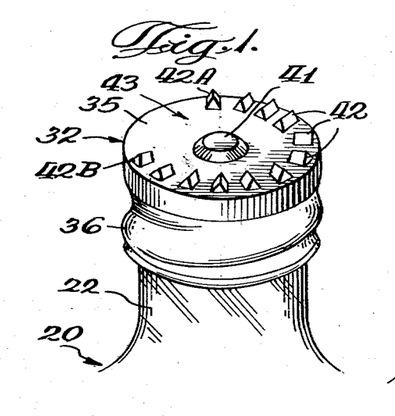
FIG. 1 is a perspective view of the inner cap member of one embodiment of the safety closure device embodying the invention shown installed on a container.
Figure 2:
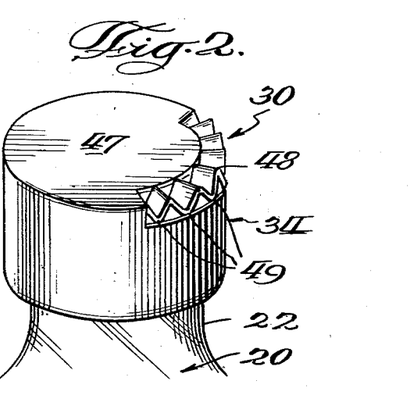
FIG. 2 is a perspective view of the outer shell member installed over the inner cap member of FIG. 1 and shown in operative association permitting the cap member and shell member to be rotated in unison.
Figures 3, 5:
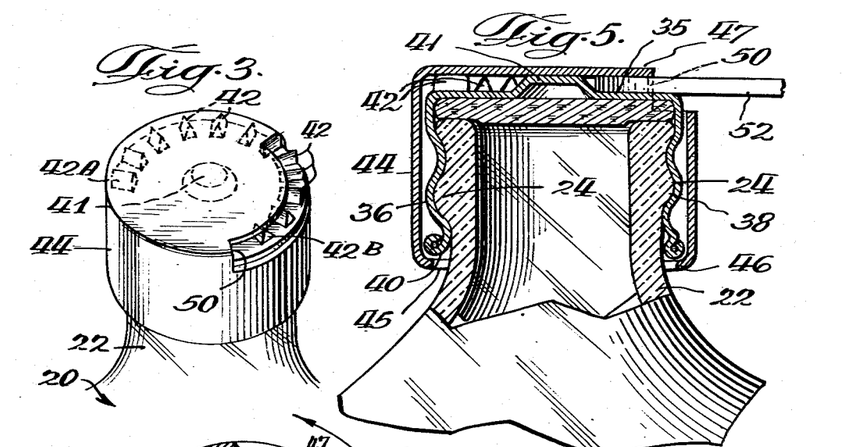
FIG. 3 is a perspective view of the assembled cap member and shell member in operative association on a container wherein the members are freely rotatable one relative to the other in opposite directions.
FIG. 5 is a sectional view taken through the safety closure along the line 5—5 of FIG. 4 in the general direction indicated and on an enlarged scale.

The shell 34 includes a generally cylindrical skirt 44 the internal diameter of which is slightly greater than the external diameter of cap 32 so that the cap can be readily accommodated on the interior of the shell upon being telescopically assembled through the open bottom end 45 thereof. The assemblage of the cap and shell member is maintained by means of the flange 46 formed on the shell 34 after assembly. The axial length of the annular shell 34 is selected so that the transverse upper wall 47 of the shell 34 will engage upon the crown of formation 41 when flange 46 is engaged below the bottom edge of skirt 36. The relative diameters of the skirts 36 and 44 ordinarily will permit the cap and shell members to be freely rotated one relative the other.

Referring to FIG. 2, the outer shell 34 initially is formed with a corrugated or pleated segment 48 of arcuate configuration adjacent the upper end thereof and penetrating into the transverse wall 47. The individual corrugations 49 of segment 48 are pitched so that when the cap 32 is telescopically engaged on the interior of the shell member 34, each corrugation can be received between a pair of adjacent bosses or ridges 42 whereby to lock the cap and shell members together for rotary movement in unison either clockwise or counter-clockwise. Thus assembled, the cap member 32 can be screwed on the neck 22 by rotating the outer shell 34. After the cap 32 is tightened on the neck 22, the corrugated segment can be broken away or removed to provide an arcuate slot 50 in the wall 44 of the skirt 44 and extending into the transverse wall 47. Upon removal of the corrugated segment 48, the shell member is freely rotatable relative to the cap member in either direction of rotation so that the cap member cannot be unscrewed from the neck formation 22. Thus, the mating engagement of the corrugations 49 with bosses 42 in the initial assembly of the cap and shell members will lock the two members together so that the cap member can be tightened on the neck 22 to close the mouth of the container. Once the segment 48 is removed from the shell member, the members 32 and 34 no longer are coupled for movement in unison either clockwise or counter-clockwise.

The corrugated segment is formed preferably by stamping in a suitable die, either during the drawing of the shell member 34 or after the same has been drawn. Obviously such a procedure assumes that the shell member is formed of sheet metal, the segment 48 being sheared from the cap while forming the same so that it is connected to the cap only at its ends and is readily torn away through the use of a simple tool such as the blade of a kitchen knife.

This structure is advantageous especially where the product in the container 20 is for both adult and children use, since the purchaser who has no problem with children tampering with the bottle may leave the corrugated portion 48 in place during the entire time that the bottle is being used and need never use an auxiliary member for opening the same. In this case, the cap and shell are substantially permanently coupled together and may be turned in unison either to open or close the bottle.

Others, of course, may desire to remove the corrugated segment 48 immediately upon purchasing the bottle, or the manufacturer may provide his distributors with both types, or the retailers may have some convenient tool to do so for the customer when the article is purchased, resulting in a package in which the shell is freely rotatable relative to the cap. The bottle cannot be opened without the use of an additional tool as will be described.

Figure 4:
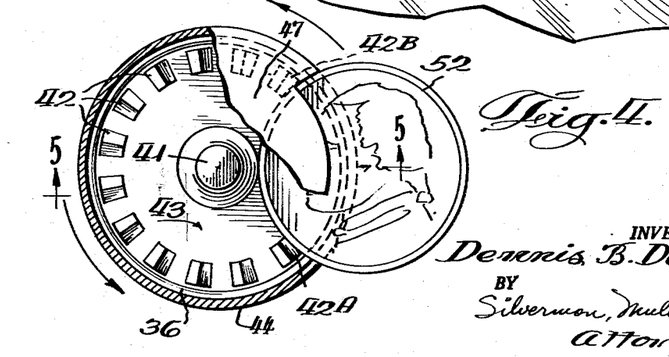
FIG. 4 is a top plan view of the safety closure of FIG. 3 showing the cooperable coupling means being rendered operative by means of a complementary tool, portions being broken away to show details.

As seen in FIGS. 4 and 5, in order to couple the members 32 and 34 for movement in unison, a suitable flat tool is inserted into the slot 50 to be engaged against and between the end ridges 42A and 42B in the space 43. The simple manner in which the members 32 and 34 can be coupled is exemplified by illustration in FIG. 5 of the coin 52 which can be used as such a coupling tool. With the tool 52 thus engaged between the bosses 42A and 42B through the slot 50 in the outer shell, the cap and shell members can be rotated simultaneously either clockwise or counter-clockwise. Upon removal of the tool 52, the shell member again is freely rotatable relative to the cap member in either direction of rotary movement. Of course, the shell member must first be rotated independently to bring slot 50 and space or indentation 43 into registry.

Figures 6, 7, 8, 9:
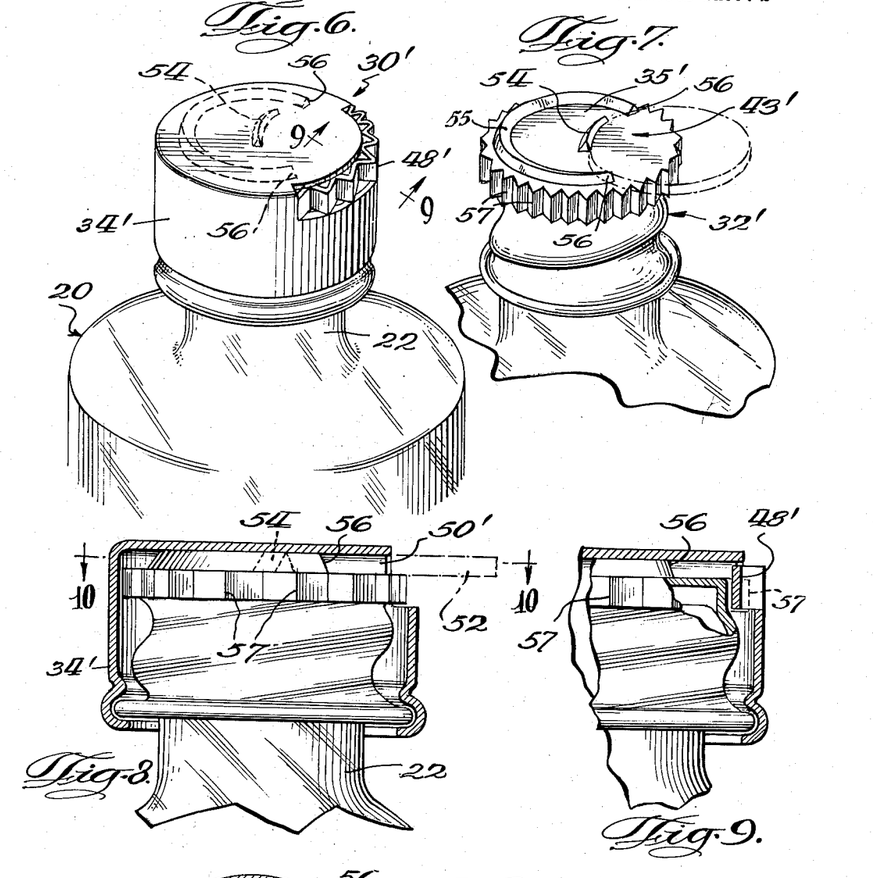
FIG. 6 is a perspective view of a modified form of safety closure installed on a container.
FIG. 7 is a perspective view of the inner cap member of the safety closure of FIG. 6 shown installed on a container.
FIG. 8 is a vertical medial sectional view taken through the installation shown in FIG. 6.
FIG. 9 is a fragmentary sectional view taken along the line 9—9 of FIG. 6.
Figure 10:
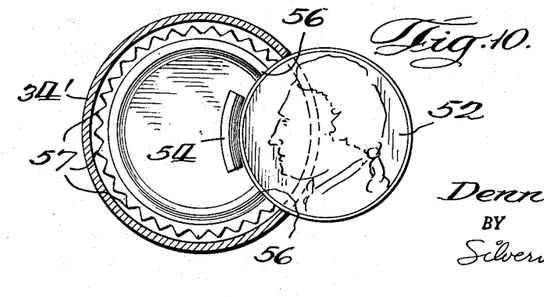
FIG. 10 is a sectional view taken along the line 10—10 of FIG. 8.
Figure 11:
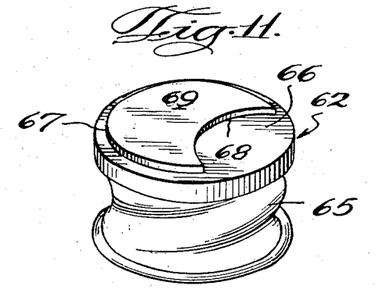
FIG. 11 is a perspective view of the inner cap member of another modified form of safety closure.
Figure 12:
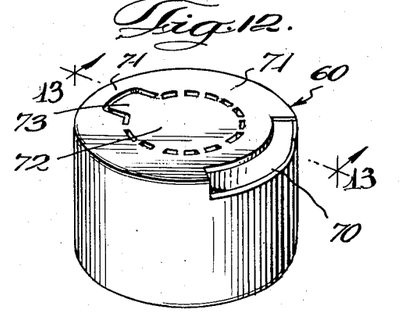
FIG. 12 is a perspective view of the outer shell member of the said safety closure.
Figure 13:
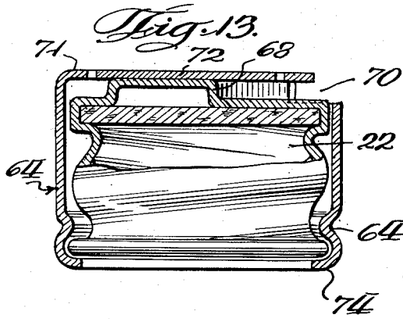
FIG. 13 is a medial sectional view taken generally along the line 13—13 of FIG. 12 and in the direction indicated, but showing the cap and shell member assembled prior to further being processed for engagement one with the other.

Referring to FIGS. 6 through 10, a modified form of the invention is designated generally by the reference character 30'. Same is comprised also of an inner cap member 32' and outer shell member 34' adapted to receive the cap member therein and suitably dimensioned so that shell 34' normally is freely rotatable relative to the cap 32'. The transverse wall 35' of the cap has an upstanding bearing or abutment formation 54 in a medial portion thereof which has been illustrated as slightly arcuate, although this configuration is not necessary. Instead of the spaced apart individual bosses 42, there is a continuous arcuate upstanding ridge 55 on the upper surface of the transverse wall 35' the ends 56 of which are spaced apart to provide the gap 43' corresponding to the space or indentation 43 of cap member 32. Further, the upper end of cap 32' has a toothed circumferential edge 57. The outer shell 34' has an arcuate corrugated segment 48' formed in a manner similar to the segment 48, but of suitable dimension and configuration to be matingly engaged with the teeth 57 of the cap member when the two members are initially assembled. With the teeth of segment 48' and edge 57 matingly engaged with one another, the cap member 32' and shell member 34' will be locked together for simultaneous rotary movement thereby enabling the cap member 32' to be tightened on the neck 22. After the cap 32' is so tightened, the segment 48' can be knocked out or otherwise removed giving rise to slot 50' as shown in FIG. 8 so that the shell member 34' is rendered freely rotatable relative the cap 32'. A flat tool such as coin 52 can then be inserted into the slot 50' for engagement with the ends 56 of the ridge 55 thereby locking the members 32' and 34' for simultaneous rotary movement in opposite directions. Of course, with the members 32' and 34' locked together in this manner, the cap 32' can be unscrewed from the neck 22. To permit the tool 52 to be used, the shell member must first be rotated relative the cap member to align the slot 50' and space or indentation 43'.

Referring to FIGS. 11 through 16, another embodiment of the invention is identified generally by the reference character 60. Same includes an inner cap member 62 and outer shell member 64 preferably formed of metal. In fact, this embodiment is especially adaptable for use of metal which is relatively inexpensive and easy to work. The shell member is suitably dimensioned to accommodate the cap on the interior thereof with the shell member normally freely rotatable relative to the cap member both clockwise and counter-clockwise. The depending skirt 65 of the cap member is threaded, as by rolling of grooves therein, to permit the cap to be screwed on the neck 22 of a container. The transverse wall 66 of the cap initially is formed with an upstanding ridge or boss 67 of generally crescent-shape. The inner arcuate edge or surface of ridge 67 is designated 68 while the upper surface is designated 69. It will be seen that the unelevated segment of the wall 66 is in the nature of a depression also relative to the elevation of ridge 67.

Figure 14:
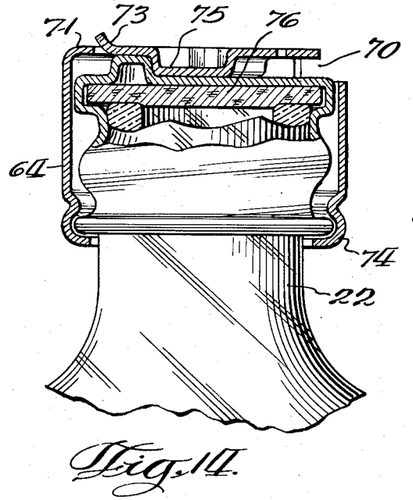
FIG. 14 is a sectional view similar to that of FIG. 13 but in this case the inner cap member and outer shell member have been locked together by embossing or pressing an irregular pattern in both of them, and the closure is shown installed on the neck of a bottle.
Figure 15:
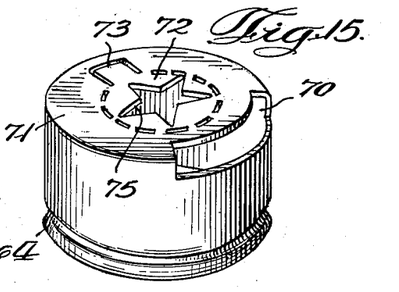
FIG. 15 is a perspective view of the structure illustrated in FIG. 14 in order to illustrate the configuration of the outer shell member after the shell member and cap have been locked together, and also to illustrate the tear-out tab.

Shell member 64 has an arcuate slot 70 in the depending skirt thereof which penetrates into the transverse wall 71 thereof. The shell 65 is independently formed with a weakened segment 72 in the medial portion of transverse wall 71 thereof (see FIG. 12) having a tab segment 73 connected thereto. The shell 64 is telescopically assembled with the cap member with the bottom end thereof curled under the bottom end of the cap as indicated at 74 to prevent axial separation of the members. As seen assembled in FIG. 13, the members are freely rotatable one relative the other clockwise and counterclockwise. Thereafter, an irregular configuration, such as the star formation 75 seen in FIG. 15, is pressed into the two members thereby also raising the tab segment 73 as seen in FIG. 14. This locks the cap and shell members for rotary movement in unison. The irregular formation 75 is pressed into the medial portion of the weakened segment 72 which is readily removable or torn out.

Figure 16:
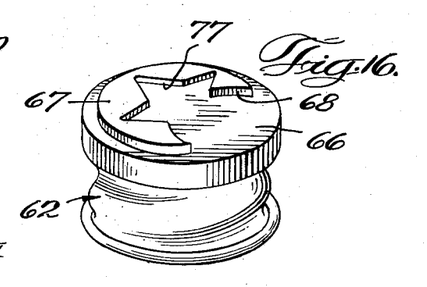
FIG. 16 is a perspective view of the inner cap member of the closure of FIGS. 11 through 15 after the irregular pattern has been embossed or pressed therein during the process of locking the same within the shell member.
Figure 17:
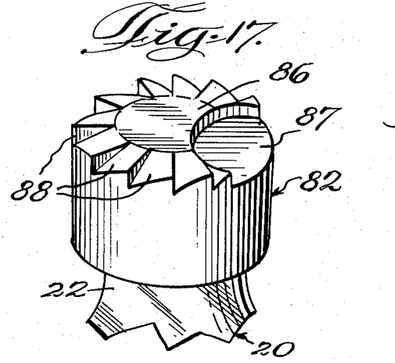
FIG. 17 is a perspective view of an inner cap member of another modified form of the invention.
Figure 18:
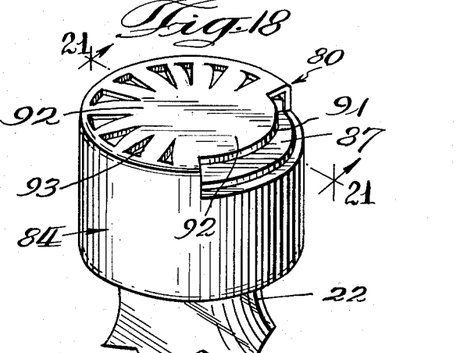
FIG. 18 is a perspective view of the shell member having the cap member of FIG. 17 engaged on the interior thereof.

In this locked condition of the members 62 and 64, the closure 60 can be tightened on the neck 22 and a suitable gasket 76 can be employed on the inside of the cap member which is removable with the cap member. A user, if he desires, can leave the cap and shell members locked together in this condition for opening and sealing the container (see FIG. 14) without need for using a special tool. However, if it is desired to use a special tool, the weakened segment 72 can be torn out by lifting up on the tab 73 thereby rendering the cap and shell members rotatable one relative the other so that the cap member cannot be unscrewed merely by rotating the shell member. As seen in FIG. 16, when the irregular configuration or star formation 75 is depressed into the two members of FIG. 13, there is a stellate configuration 77 likewise formed in the ridge 67 which intersects the arcuate edge 68. To unscrew the cap member, the shell must first be independently rotated to align the slot 70 with said arcuate edge 68 and then, a flat tool, such as coin 52 may be inserted through the slot 70 into engagement with the edge 68. This locks the members for rotary movement in unison but when the tool 52 is removed, the shell member again is free to rotate relative to the cap member.

In connection with the safety closure 60, the invention also contemplates a novel method of forming a safety closure of the character described employing metal components which can easily and cheaply be provided with locking means for rotary movement in unison merely by pressing irregular configurations thereinto and which locking means can be removed by removing a portion of said pressed configurations.

Figures 19, 20:
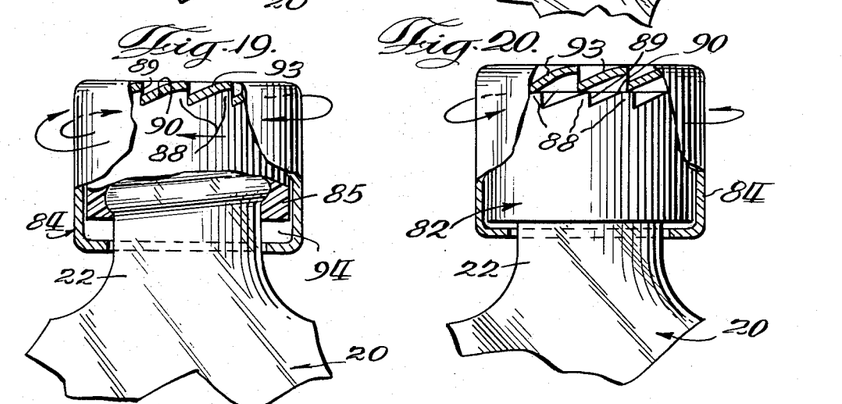
FIGS. 19 and 20 are side elevational views of the safety closure of FIG. 18 showing the members coupled and uncoupled respectively, each having portions broken away to show details.

Referring to FIGS. 17 through 21, another modified form of the invention has been designated generally by the reference character 80. The closure 80 also is comprised of an inner cap 82 and outer shell member 84 adapted to receive the cap 82 therein. The cap 82 has a cylindrical skirt 85 internally grooved to permit screwing of the cap onto a threaded neck 22, as described in connection with the previous embodiments. The transverse wall 86 of the cap member has an arcuate-shaped depression 87 contiguous to the perimetric edge thereof and a series of spaced apart ratchet teeth or step formations 88 circularly arranged on the surface adjacent the perimetry of the cap 82. As seen in FIG. 19, each tooth 88 has a vertical riser surface 89 and a bearing surface 90 slanted upwardly from the base of the surface 89 to the upper surface of the wall 86.

The outer shell 84 has an arcuate slot 91 cut in the circumferential wall thereof which penetrates into the upper transverse wall 92 of the shell. A series of spaced apart depending resilient tongues 93 are struck from the wall 92 following the contour of the marginal rim of the wall 92. In this embodiment, the outer shell 84 also is longer than the cap member 82 by an amount at least equal to the length of surface 89 of a said step formation, i.e., the height of the teeth. As seen in FIG. 19, this greater length of the shell is indicated by the space 94 which appears when the tongues 93 are riding on the surfaces 90. The space 94 will permit separation of the cap and shell members along their axes.

Figure 21:
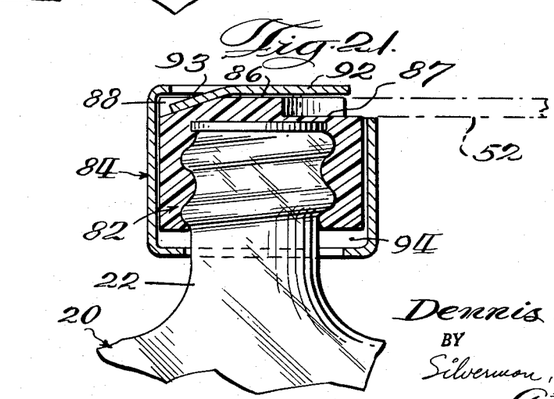
FIG. 21 is a sectional view taken through the safety closure of FIGS. 17 through 21 along the line 21—21 of FIG. 18.

To lock the cap and shell members for rotary movement simultaneously in a counter-clockwise direction, a flat tool, such as coin 52 shown in phantom in FIG. 21, can be inserted through slot 91 to engage in the depressed portion 87. This would be desirable for unscrewing the cap member from the neck of a container. It may further be noted from FIG. 20 that with the shell member elevated relative to the cap member, the tongues 93 just clear the upper ends of the riser surfaces 89 so that the shell member may be considered freely rotatable relative to the cap member both counterclockwise and clockwise in this position thereof. The step-formations on the cap members and tongue members on the shell member cooperate in the nature of a ratchet mechanism for coupling the two members for rotary movement in unison in one direction but still permitting free relative movement therebetween under certain conditions in opposite directions, as well. Again, the shell member 84 is rotatable independently for aligning slot 91 and depression 87 one with the other for reception of the tool 52.

Figures 22, 22A:
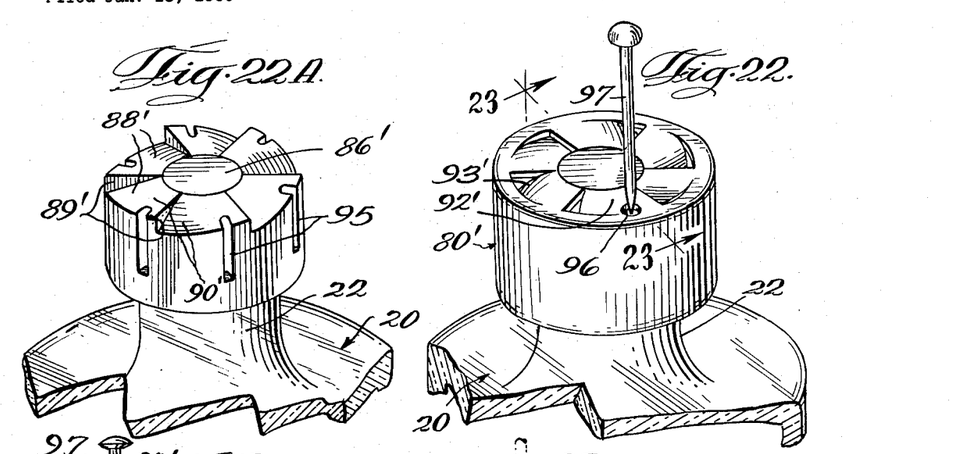
FIG. 22 is a fragmentary perspective view of another modified form of safety closure shown installed on the neck of a container and FIG. 22A is a similar perspective view showing only the inner cap member of said safety closure.
Figures 23, 24, 25, 27:
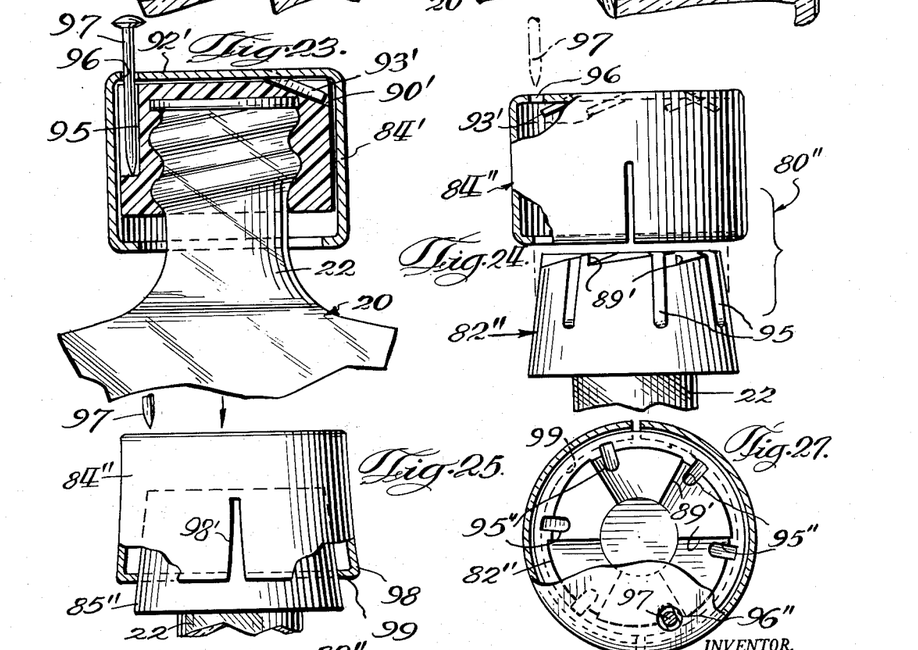
FIG. 23 is a sectional view taken along the line 23—23 of FIG. 22.
FIG. 24 is an exploded elevational view of another modified form of the invention with portions of the outer shell member thereof in section.
FIG. 25 is a view similar to FIG. 24 showing the outer shell member in the process of being telescopically engaged over the inner cap member.
FIG. 27 is a plan view of the safety closure of FIG. 24 as assembled together with portions broken away to show details.

Referring to FIGS. 22 through 23, a modified form of the safety closure 80 is identified by the reference character 80'. Distinguishing from the safety closure 80, the cap member 82' has a series of step-formations 88' around the complete marginal rim thereof and therefore lacks the arcuate depression 87 of cap 82. A plurality of circumferentially spaced apart axially extending slots 95 are provided in the annular skirt of the cap member, each slot extending parallel to the longitudinal axis of the cap member and opening at its upper end to the transverse wall 86' thereof. Each slot opens to the slanted surface 90' of a step formation spaced from the riser surface 89' thereof. The outer shell member 84' has a ring of spaced apart tongues 93' struck from the transverse wall 92' so that the slot 91 of the shell 84 is omitted. An opening 96 is provided in the transverse wall 92 which is designed to cooperate with a slot 95 for coupling of the cap and shell members as will be described.

It will be understood that the cooperation of the step formations 88' and tongues 93' gives rise to a ratchet mechanism similar to that described in connection with the safety closure 80. Thus, with the tongues 93' engaged with the formations 88' the cap member 82' and shell member 84' can be rotated in unison clockwise, for instance, for the purpose of tightening the safety closure 80' on a neck 22. By elevating the shell 84' relative the cap 82', the shell can be rotated freely in opposite directions, but mere rotation of the shell counter-clockwise relative the cap member will not effect operative engagement of the formations 88' and tongues 93'. To couple or lock the cap and shell members for rotation in unison in a clockwise or counter-clockwise direction, such as for unscrewing the cap member, a thin elongate tool, such as pin 97, can be inserted through opening 96 into engagement with a slot 95, as shown in FIG. 23. The desired registry of opening 96 with a slot 95 is achieved by independent rotation of the shell member.

Figure 26:
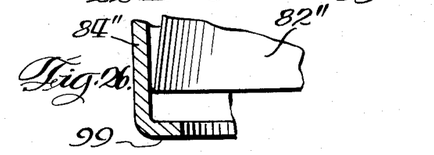
FIG. 26 is a fragmentary elevational view showing how completion of the outer shell being engaged with the inner cap member of FIG. 25.

The embodiment of the invention shown in FIGS. 24 through 27 is designated 80" and is a further modification of the safety closure 80. In safety closure 80", the annular skirt 85" of the cap member 82" is generally frusto-conical in configuration with the greater diameter at the bottom end thereof. The cylindrical depending skirt of the shell member is formed with a longitudinal slot 98' to permit the shell member to be slid over the cap member as shown in FIG. 25 and spread the bottom end of the shell member as indicated at 98. In FIG. 26, the inturned flange 99 of the shell member has been slid past the bottom end of the cap member to be engaged therebeneath and prevent axial separation of the cap and shell members.

Figures 28, 29, 30, 31, 32, 33:
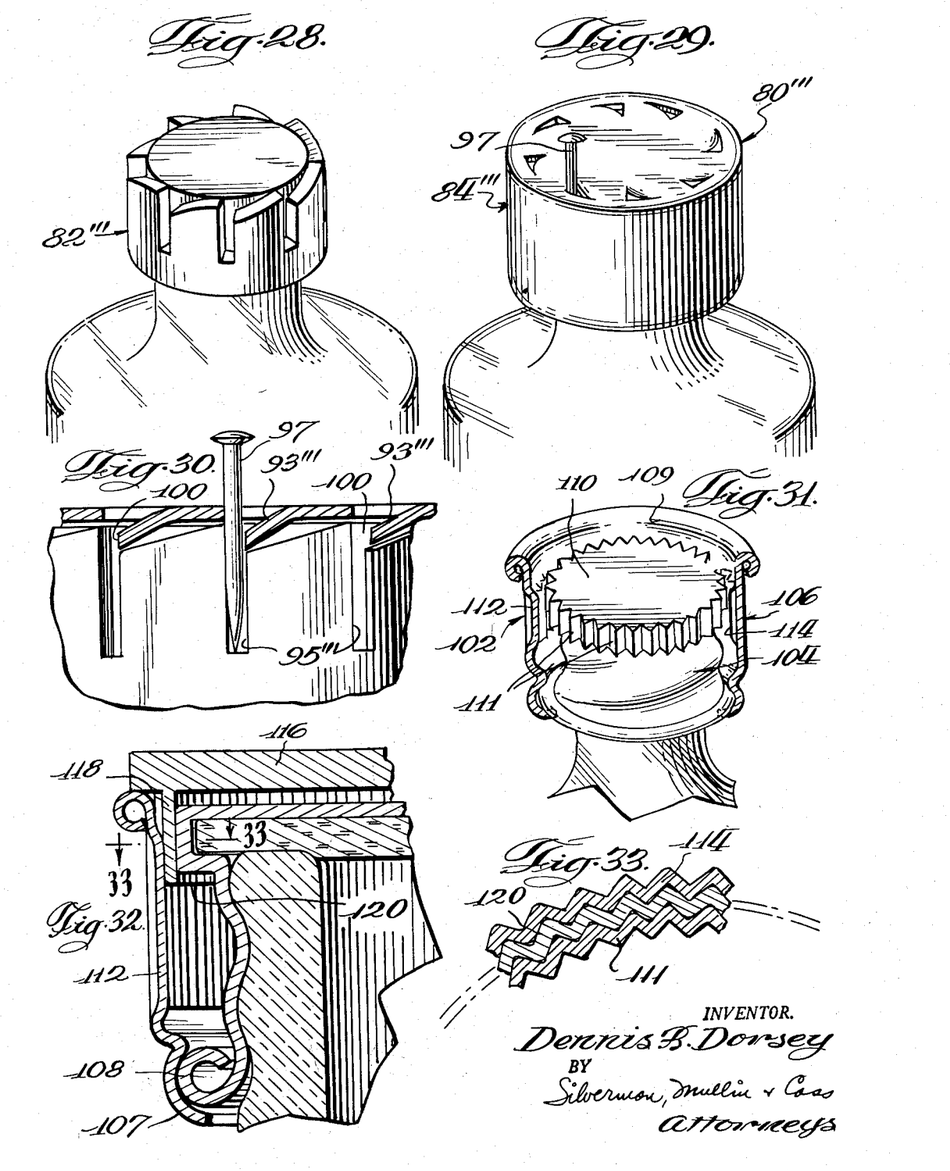
FIG. 28 is a perspective view of the inner cap member of another modified form of the invention.
FIG. 29 is a perspective view showing the modified form safety closure with the inner cap member of FIG. 28 engaged on the interior of the outer shell member of this embodiment.
FIG. 30 is a fragmentary vertical sectional view taken through the embodiment of FIG. 29 and on an enlarged scale.
FIG. 31 is a fragmentary perspective view of another modified embodiment of the invention with portions of the outer shell member broken away to show the inner cap member thereof.
FIG. 32 is a fragmentary vertical sectional view taken through the modified embodiment of FIG. 31 and enlarged.
FIG. 33 is a sectional view taken along the line 33—33 of FIG. 32.

Referring to FIGS. 28 through 30, a modified form of the closure 80" is identified by the reference numeral 80'''. The safety closure 80''' is substantially identical to closure 80" with the following exceptions. The individual slots 95''' are formed as a continuation of the riser surface of a step formation provided on the transverse wall of the cap member 82''' and the shell member 84''' has a plurality of depending tongues 93''' adapted to be engaged with the step formations. In addition, during forming of the tongues 93''', an additional space or opening 100 is provided between the extremity of each tongue and adjacent body portion of the transverse wall of the shell member. Thus, to lock the shell and cap members for rotary movement simultaneously in a counter clockwise direction, a pin 97 can be inserted through an opening 100 into the slot 95''', as shown in FIG. 30, by rotating the shell member independently to achieve the desired registry of opening 100 with a said slot.

Referring to FIGS. 31 through 33, another modified form of the invention is designated generally by the reference character 102. Same is comprised of an inner cap member 104 and an outer shell member 106 adapted to be telescopically engaged with the cap member. The relative dimensions of the cap and shell members are selected so as normally to permit the shell member and cap member to be rotated one relative the other. The shell member has an inturned flange 107 at the lower end thereof matingly engaged with the annular bead 108 on the bottom end of the cap member to prevent axial separation of the members. The opposite end 109 of the shell member is open and the cap member is recessed in said open end of the shell.

The transverse wall 110 of the cap member has a corrugated or toothed marginal rim 111 and the annular skirt 112 of the shell member has a corrugated or toothed ring 114 on the inner surface thereof aligned with the marginal rim when the cap and shell members are assembled together. The inner diameter of the shell member is sufficiently larger than the external diameter of the cap member to provide clearance between the aligned toothed portions 111 and 114 so that the shell member normally is freely rotatable relative to the cap member in either direction of rotation. To lock the members for simultaneous rotary movement, a locking key member 116 having a generally cylindrical depending skirt 118 is inserted through open end 109 between the cap and shell members. The skirt 118 is corrugated or pleated as indicated at 120 in FIG. 33 so that the inner and outer teeth thereof matingly engage with the teeth of segments 111 and 114 thereby coupling the cap and shell members for rotary movement in unison, either clockwise or counterclockwise. When the locking key 116 is removed, the cap and shell members again are freely rotatable one relative the other.

Figure 34:
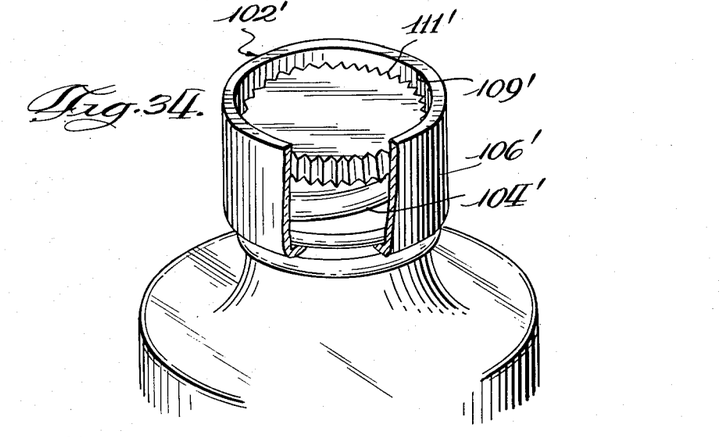
FIG. 34 is a perspective view of another embodiment of the invention installed on the neck of a container, portions of the outer shell member being broken away.
Figure 35:
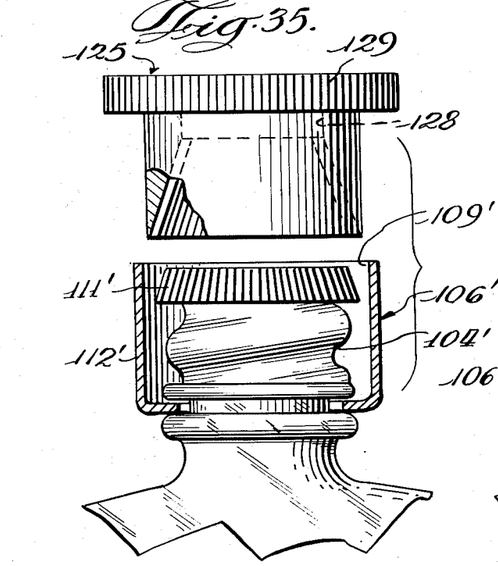
FIGS. 35 and 36 are vertical sectional views taken through the embodiment of FIG. 34 and showing how the cap member and shell members are coupled by means of a special complementary tool for rotating said members in unison.
Figure 36:
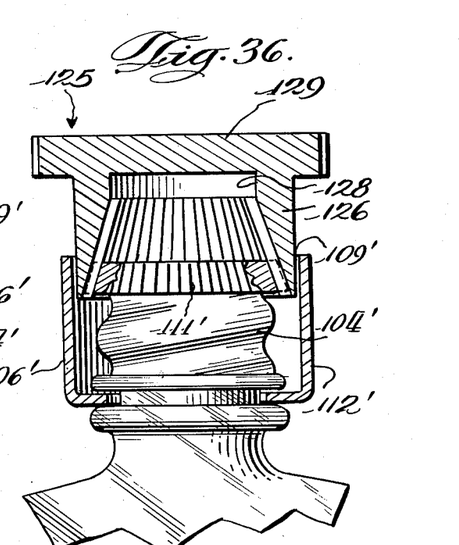

Referring to FIGS. 34 through 36, another modified form of the invention is designated generally by the reference charcter 102'. The closure 102' is similar to the closure 102 in many respects. The cap member 104' is substantially identical to the cap member 104 however, the marginal run thereof is tapered as seen in FIG. 35. The shell member 106' is similar to the shell member 106 with the exception of elimination of any corrugations or teeth 120 provided on the shell 106. The upper end 109' of the shell member likewise is open. The dimensional relationship between the cap and shell members permits the shell member to be freely rotated relative to cap member in opposite directions.

To couple the shell and cap members for simultaneous rotary movement in opposite directions, a locking key 125 is provided. The key 125 is in the form of an inverted dish-member having a hollow, cylindrical skirt 126 substantially longer than corresponding skirt of the key member 116. The external circumferential surface of skirt 126 is smooth whereas the internal surface thereof is substantially frusto-conical in configuration with the smaller diameter end 128 adjacent the head 129 of the key member. The internal surface is ribbed or corrugated as indicated at 130 along substantially the entire axial length of the skirt 126. To use the locking key member 125, the skirt 126 is inserted through the open end 109' between the knurled or corrugated marginal rim 111' and the skirt 112' to engage the corrugations 130 with the corrugations of the marginal rim 111' and frictionally engage the external surface of the skirt 126 with the interior surface of shell member 112' thereby locking the cap and shell members together. In this condition, the shell and cap members can be rotated in unison either clockwise or counterclockwise, as desired.

It will be appreciated that the frusto-conical configuration provided for the interior surface of the skirt 126 will enable the same locking key 125 to be used for different sizes of cap members and still assure a firm and positive coupling of the cap and shell members.

It is believed the invention has been described in sufficient detail to enable the skilled artisan to understand and practice the same. Economical, mass-production techniques can be employed advantageously to make the shell and cap members of the several embodiments described and illustrated. A liberal and broad construction of the language of the claims hereto appended is intended commensurate with the progress in the arts and sciences contributed by the invention.

What it is desired to secure by Letters Patent of the United States is:

1. A safety closure for a container having a threaded neck, said closure adapted to be screwed onto said neck for sealing the container and unscrewed therefrom to provide access to the contents of the container, said closure comprising, an inner cap having screw means for matingly engaging with the threaded neck and an outer shell having said cap telescopically assembled therein, said outer shell and inner cap having a selectively severable connection therebetween for rendering the shell independently rotatable relative to the cap, and said shell and cap having cooperable coupling means enabling insertion of a tool into the closure to couple the cap and shell together for simultaneous rotary movement in the event said connection is severed.

2. A safety closure for a container having a threaded neck, said closure adapted to be screwed onto said neck for sealing the container and unscrewed therefrom to provide access to the contents of the container, said closure comprising, an inner cap having screw means for matingly engaging with the threaded neck and an outer shell having said cap telescopically assembled therein, said outer shell and inner cap having a selectively severable connection therebetween for rendering the shell independently rotatable relative to the cap, and said shell and cap having cooperable coupling means enabling insertion of a tool into the closure to couple the cap and shell together for simultaneous rotary movement in the event said connection is severed, said connection comprising interengageable juxtaposed portions of the shell and cap.

3. A safety closure as described in claim 2 in which said juxtaposed portion of the shell is displaceable to sever said connection.

4. A safety closure as described in claim 3 in which said displaceable portion is selectively removable from the shell.

5. A safety closure as described in claim 2 in which said juxtaposed portions have teeth formations thereon for establishing said connection.

6. A safety closure as described in claim 5 in which said juxtaposed portion of the shell comprises a corrugated arcuate segment thereof and the arcuate segment is selectively removable from the shell to sever said connection.

7. A safety closure as described in claim 2 in which said connection is a ratchet-type connection.

8. A safety closure as described in claim 2 in which said cap and shell are each substantially cylindrical in configuration having a transverse wall at one end thereof, and said juxtaposed portions are provided on said transverse walls.

9. A safety closure as described in claim 8 in which said juxtaposed portion of the cap has spaced apart upstanding formations, and said juxtaposed portion of the shell has depending teeth formations engageable between said upstanding formations.

10. A safety closure as described in claim 8 in which said juxtaposed portions have an irregular configuration depressed thereinto and the juxtaposed portion of the shell is removable to sever the connection.

11. A safety closure as described in claim 2 in which the shell and cap each are substantially cylindrical in configuration and said juxtaposed portions are provided on circumferential surfaces of the cap and shell.

12. A safety closure as described in claim 11 in which said juxtaposed circumferential surfaces have engaging corrugations.

13. A safety closure as described in claim 2 in which said cap and shell each are substantially cylindrical in configuration and each has a transverse end wall, and said connection comprises step formations on the end wall of the cap and depending tongue formations on the end wall of the shell engageable with said step formations.

14. A safety closure as described in claim 2 in which the shell is independently rotatable clockwise and counterclockwise relative to the cap when the connection is severed.

15. A safety closure for a container having a threaded neck, said closure adapted to be screwed onto said neck for sealing the container and unscrewed therefrom to provide access to the contents of the container, said closure comprising, an inner cap having screw means for matingly engaging with the threaded neck and an outer shell having said cap telescopically assembled therein, said outer shell and inner cap having a selectively severable connection therebetween for rendering the shell independently rotatable relative to the cap, and said shell and cap having cooperable coupling means enabling insertion of a tool into the closure to couple the cap and shell together for simultaneous rotary movement in the event said connection is severed, said connection comprising interengageable juxtaposed portions of the shell and cap, said coupling means including an opening in the outer shell and means on the cap cooperating with said shell opening to permit insertion of the tool through said opening into locking engagement with the shell and cap.

16. A closure as described in claim 15 in which said opening is provided in one end of the shell and the depressed formation is provided on a circumferential surface of the cap.

17. A closure as described in claim 15 in which said opening is provided in one end of the shell and the depressed formation is provided on a circumferential surface of the cap, and said tool comprises a key member having a depending skirt insertable through said opening into mating engagement with facing circumferential surfaces of the shell and cap.

18. A closure as described in claim 17 in which said depending skirt has ridges thereon substantially parallel to the longitudinal axis of the skirt.

19. A closure as described in claim 17 in which said depending skirt is generally frusto-conical in configuration and has ridges on the internal surface thereof.

20. A closure as described in claim 15 in which said coupling means includes a toothed formation protruding from a circumferential surface of one of the cap and shell members, and the key member has a complementary toothed formation for engaging with the first mentioned toothed formation.

21. A safety closure for a container having a threaded neck, said closure adapted to be screwed onto said neck for sealing the container and unscrewed therefrom to provide access to the contents of the container, said closure comprising, an inner cap having screw means for matingly engaging with the threaded neck and an outer shell having said cap telescopically assembled therein, said outer shell and inner cap having a selectively severable connection therebetween for rendering the shell independently rotatable relative to the cap, and said shell and cap having cooperable coupling means enabling insertion of a tool into the closure to couple the cap and shell together for simultaneous rotary movement in the event said connection is severed, said connection comprising interengageable juxtaposed portions of the shell and cap, said coupling means including an opening in the outer shell and a depressed formation in the inner cap required to be brought into a predetermined position of registry one with the other to permit insertion of the tool by independent rotary movement of the shell.

22. A closure as described in claim 21 in which the tool is inserted in a movement transverse to the longitudinal axis of the shell.

23. A closure as described in claim 21 in which the tool is inserted in a movement substantially parallel to the longitudinal axis of the shell.

24. A closure as described in claim 21 in which said cap and shell each has a transverse end wall and said opening is provided in the transverse end wall of the shell.

25. A closure as described in claim 21 in which said cap has a transverse end wall and the depressed formation is provided in said end wall adjacent the marginal rim thereof.

26. A closure as described in claim 21 in which said cap has a transverse end wall and the depressed formation comprises a slot opening to said end wall.

27. A closure as described in claim 21 in which said opening is provided in a circumferential wall of the shell, said cap has a transverse end wall and the depressed formation is provided in said end wall.

28. A safety closure for a container having a threaded neck, said closure adapted to be screwed onto said neck for sealing the container and unscrewed therefrom to provide access to the contents of the container, said closure comprising, an inner cap having screw means for matingly engaging with the threaded neck and an outer shell having said cap telescopically assembled therein, said outer shell and inner cap having a selectively severable connection therebetween for rendering the shell independently rotatable relative to the cap, and said shell and cap having cooperable coupling means enabling insertion of a tool into the closure to couple the cap and shell together for simultaneous rotary movement in the event said connection is severed, said connection comprising interengageable juxtaposed portions of the shell and cap, said coupling means including an opening in the outer shell and a depressed formation in the inner cap required to be brought into a predetermined position of registry one with the other to permit insertion of the tool by independent rotary movement of the shell, said connection comprising said shell and cap having facing surfaces and the surfaces having interengaging segments for establishing said connection, the segment of the shell being removable to provide said opening.

29. A safety closure for a container having a threaded neck, said closure adapted to be screwed onto said neck for sealing the container and unscrewed therefrom to provide access to the contents of the container, said closure comprising, an inner cap having screw means for matingly engaging with the threaded neck and an outer shell having said cap telescopically assembled therein, said outer shell and inner cap having a selectively severable connection therebetween for rendering the shell independently rotatable relative to the cap, and said shell and cap having cooperable coupling means enabling insertion of a tool into the closure to couple the cap and shell together for simultaneous rotary movement in the event said connection is severed, said connection comprising said cap and shell having matingly engaged segments thereof establishing said connection, the segment of the shell being removable to sever the connection.

30. A closure as described in claim 29 in which said segments have matingly engaged toothed formations.

31. A safety closure for a container having a threaded neck comprising, an inner cap member having screw means for engaging the cap on the neck to seal the container, a shell member having the cap member telescopically engaged therein, said shell and cap member having cooperating locking means for releasably locking the members together for simultaneous rotary movement, said locking means being releasable to permit independent rotary movement of the shell member relative to the cap member, said shell and cap member having cooperating coupling means for coupling of the members for rotary movement in unison when the locking means are released, said coupling means enabling a complementary tool to be operatively associated therewith only by independent rotation of the shell to bring the coupling means into a predetermined position of registry one with the other, said locking means including a segment of the shell member adapted to be permanently removed therefrom for releasing the locking means.

32. A safety closure as described in claim 31 in which said tool is so operatively associated in a movement transverse to the longitudinal axes of the shell and cap members.

33. A safety closure for a container having a threaded neck comprising, an inner cap member having screw means for engaging the cap on the neck to seal the container, a shell member having the cap member telescopically engaged therein, said shell and cap member having cooperating locking means for releasably locking the members together for simultaneous rotary movement, said locking means being releasable to permit independent rotary movement of the shell member relative to the cap member, said shell and cap member having cooperating coupling means for coupling of the members for rotary movement in unison when the locking means are released, said coupling means enabling a complementary tool to be operatively associated therewith only by independent rotation of the shell to bring the coupling means into a predetermined position of registry one with the other, said locking means comprising a ratchet-type connection between the cap and shell.

34. A safety closure as described in claim 33 in which said tool is so operatively associated in a movement substantially parallel with the longitudinal axes of the shell and cap members.

References Cited in the file of this patent

UNITED STATES PATENTS

| | | |
|---|---|---|
| 2,359,639 | Hanahan | Oct. 3, 1944 |
| 2,921,705 | Dorsey | Jan. 19, 1960 |
| 2,964,207 | Towns | Dec. 13, 1960 |